Oct. 29, 1940.                    E. W. DAVIS                    2,219,681
                              LUBRICATING APPARATUS
                              Filed Nov. 11, 1935                2 Sheets-Sheet 1

Oct. 29, 1940.  E. W. DAVIS  2,219,681
LUBRICATING APPARATUS
Filed Nov. 11, 1935  2 Sheets-Sheet 2

Inventor:
Ernest W. Davis
By Williams, Bradbury, McCaleb & Hinkle
Attys

Patented Oct. 29, 1940

2,219,681

UNITED STATES PATENT OFFICE

2,219,681

LUBRICATING APPARATUS

Ernest W. Davis, Oak Park, Ill., assignor to Stewart-Warner Corporation, Chicago, Ill., a corporation of Virginia Application November 11, 1935, Serial No. 49,173

9 Claims. (Cl. 184—7)

My invention relates generally to lubricating apparatus, and more particularly to an improved centralized lubricating system in which the frequency of application of lubricant pressure to the pipe line system leading to the bearings is automatically controlled and may be manually adjusted.

In the lubricating system of my invention the parts to be lubricated are each supplied with a metering device in the form of a measuring valve. These measuring valves are connected to a single lubricant supply line and lubricant is supplied to this line by a continuously operating power driven pump which has mechanism for by-passing lubricant from the pump during predetermined time intervals so that the measuring valves will be periodically charged with lubricant under pressure.

It is thus an object of my invention to provide an improved centralized lubricating system having a central pumping mechanism operable to supply lubricant under pressure to measuring valves adjacent the bearings at predetermined regular intervals.

A further object of my invention is to provide an improved pumping mechanism of the aforesaid type in which the duration of the intervals between the supplying of lubricant under pressure may be readily varied.

A further object is to provide a pumping mechanism for a centralized lubricating system which is in the form of a unit incorporating a pump equipped with a time control mechanism for determining the intervals between effective operation of the pump.

Other objects will appear from the following description, reference being had to the accompanying drawings, in which:

Fig. 3 is a bottom plan view of the body of one of the measuring valves; and

Fig. 4 is a diagrammatic view of the pumping mechanism to illustrate more clearly the principles of its operation.

Figure 1:
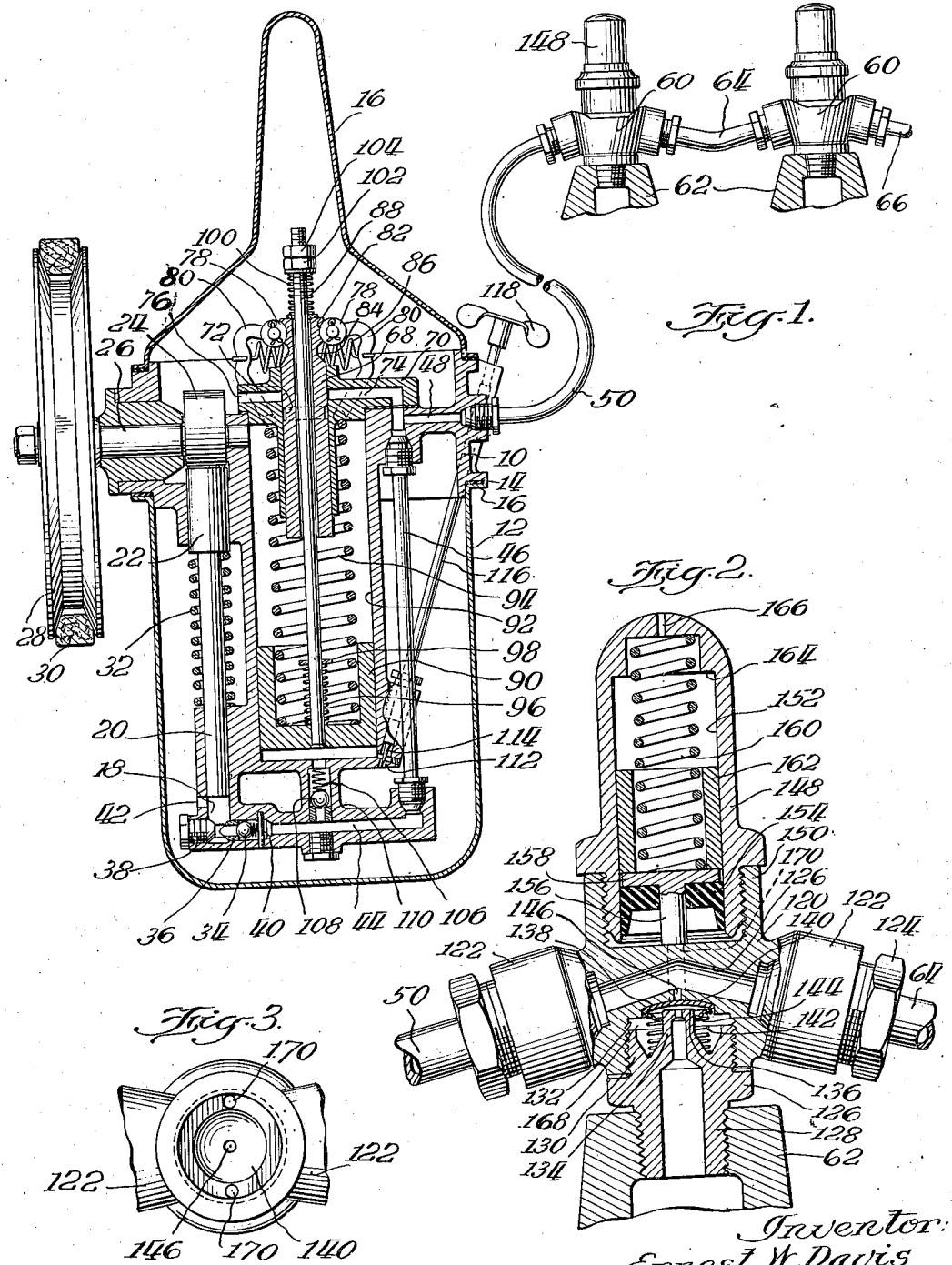
Fig. 1 is a central vertical section of the pump unit shown connected with a plurality of measuring valves, the latter being shown in elevation.

In the lubricating system of my invention I employ measuring valves which are provided with means for measuring a charge of lubricant and storing it under pressure. The measuring valve shown in the present application is of the general type illustrated in Ericson and Wheeler Patents Nos. 1,908,641 and 1,915,302.

The pumping mechanism comprises a die cast body 10 to which a bowl-shaped lubricant reservoir 12 is suitably secured, a gasket 14 being interposed between the body 10 and a flange 16 on the reservoir to prevent leakage of lubricant. A suitable cap 16 is fitted over the top of the body 10 to prevent the admission of dust and dirt. The body 10 depends into the reservoir 12 and near its lower end is provided with a cylindrical bore 18, the lower end of which forms a high pressure cylinder and the upper end of which forms a guide for a plunger 20. The plunger has a head 22 at its upper end for engagement with a cam 24 which is secured to a shaft 26. The shaft 26 may be rotated by any suitable means such as the pulley 28 driven by a belt 30. The plunger 20 is held in engagement with the cam 24 and moved on its retractile stroke by a compression coil spring 32 which surrounds the plunger 20 and abuts against the shoulder formed at the lower end of the head 22.

The high pressure cylinder 18 is provided with an outlet check valve 34 engaging a check valve seat 36 and to which access may be had for cleaning by removal of a plug 38. The check valve 34 is prevented from moving a substantial distance from its seat 36 by a pin 40. Lubricant may flow from the reservoir 12 into the high pressure cylinder 18 through an inlet port 42.

The lubricant discharged under pressure by the pump 20 flows through a passageway 44, through a tube 46, into a branch passageway 48 formed in the upper end of the body 10, and thence through a conduit 50 to the first measuring valve 60 which is attached to a bearing part 62 which is to be supplied with lubricant. Additional conduits 64, 66 are provided to connect additional measuring valves 60 to the pumping mechanism. The measuring valves of any desired number may be connected in any suitable branch or series arrangement by suitable conduit connections, although in most installations it will be found desirable to connect a number of measuring valves in series as illustrated in Fig. 1.

Flow through the passageway 48 and hence to the measuring valves is controlled by a sliding valve 68 which is vertically reciprocable in a head 70 suitably secured to the body 10. The valve member 68 is shown in closed position in Fig. 1, being provided with an annular groove 72 which, when the valve is shifted upwardly from the position shown in Fig. 1, will connect a passageway 74 with an open end extension 76 thereof. The passageway 74 is in direct communication with the tube 46 and passageway 48. The valve 68 is held in its uppermost and lowermost positions respectively, and is urged to the ends of its stroke by a pair of rollers 78, carried by pivoted arms 80, and which are resiliently held in engagement with one or the other of two annular grooves 82, 84, of the valve 68, by a tension coil spring 86 the ends of which are anchored to the arms 80.

The valve 68 has an axial bore extending longitudinally therethrough to receive a valve actuating rod 88, the lower end of which is secured to a piston 90. The piston 90 is slidably mounted in a cylinder 92 and is normally urged downwardly by a compression coil spring 94, the upper end of which abuts against the inner surface of the head 70. A relatively light compression coil spring 96 surrounds the lower end of the rod 88 and has a loose washer 98 resting thereon. A light coil spring 100, similar to the spring 96, surrounds the upper end of the rod 88 being adapted to be compressed between the valve 68 and an adjustable stop on the rod, illustrated as a nut 102 and lock nut 104.

A passageway 106 connects the passageway 44 with the lower end of cylinder 92, downward flow through this passageway being prevented by a spring pressed check valve 108 engaging a check valve seat 110. Flow from the lower end of the cylinder 92 to the interior of the reservoir 12 may take place through a needle valve port 112, the orifice of which is controlled by an adjustable needle valve 114 having a stem 116 which projects exteriorly of the body casting 10 and has a suitable handle 118 secured thereto.

Figure 2:
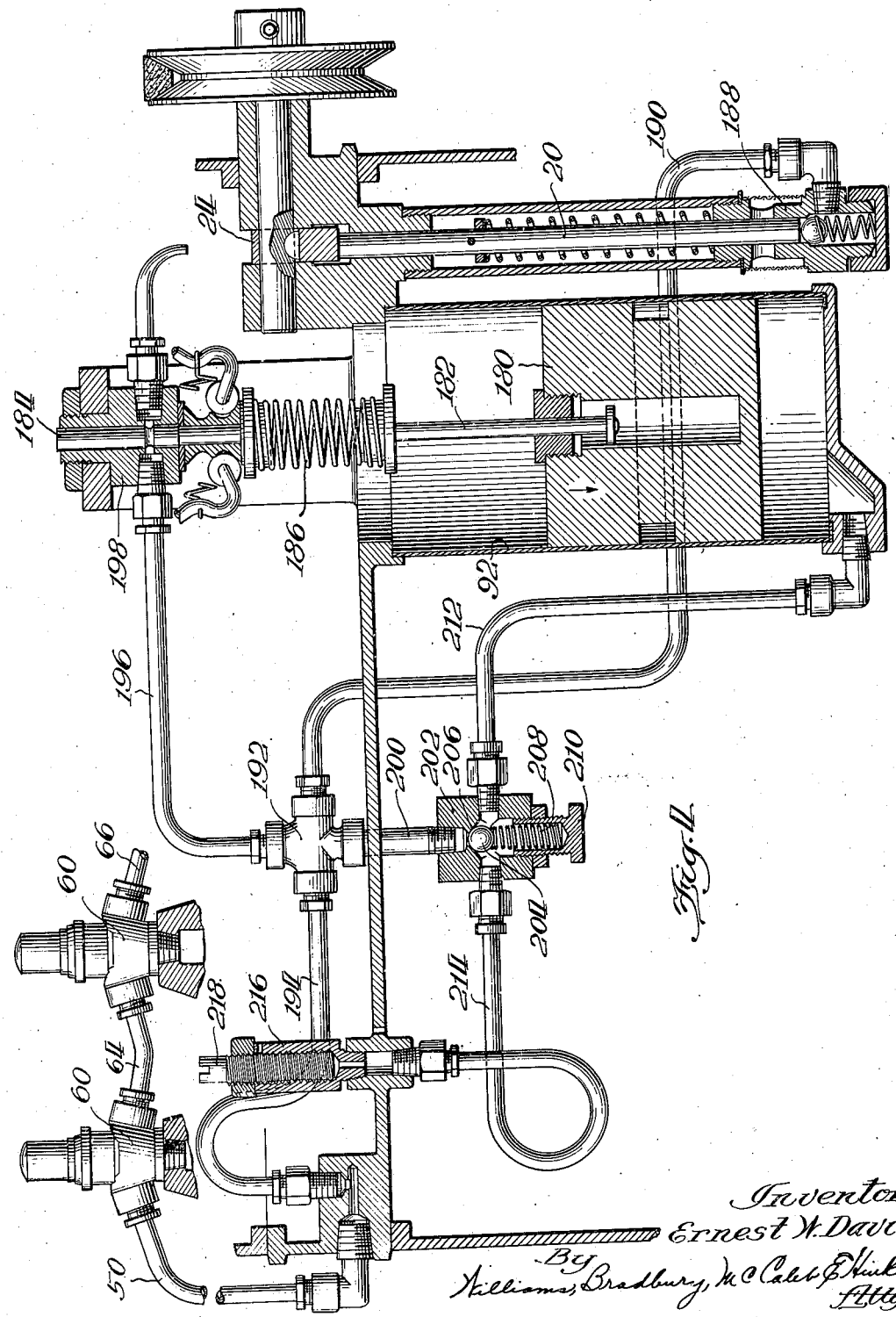
Fig. 2 is a fragmentary vertical sectional view of one of the measuring valves.

The preferred form of measuring valve utilizable in the system of my invention and which is shown in Figs. 2 and 3, comprises a body 120 which has a pair of bosses 122 formed integrally therewith, the bosses being tapped to receive bushings 124 of connectors for the ends of conduits such as 50 and 64. Both conduits communicate directly with a passageway 126 extending through the body 120. An outlet valve seat member 126 has its lower end 128 suitably tapped so that the measuring valve may be screwed into the oil hole of a bearing and has its upper end 130 threaded and screwed into a tapped bore 132 formed in the lower end of the body 120. The valve seat member has an upwardly extending central projection 134, the upper end face 136 of which forms a seat for a flexible valve 138. The projection 134 has a suitable passageway extending therethrough for conducting lubricant to the bearing.

The valve 138 is normally held in contact with a substantially spherically concave valve seat 140 formed in the body 120 by a compression coil spring 142, a suitably formed spring seat 144 being interposed between the end of the spring and the valve 138 evenly to distribute the force of the spring about the periphery of the valve 138. A port 146 intersects the seat surface 140 of the valve and communicates with the passageway 126 formed in the body.

A pressure reservoir 148 is threaded in a boss 150 formed at the top of the body 120 and is bored to provide a cylinder 152 in which a cup-shaped piston 154 is reciprocable. The piston may be made of leather but is preferably made of a suitable oil resistant rubber or rubber substitute composition. The piston 154 is apertured to provide for a stop 156 which may be formed integrally with a piston backing plate 158, the stop 156 limiting downward movement of the backing plate 158 under the influence of a compression coil spring 160. The lower end of the coil spring 160 is guided by a sleeve 162 which rests on the piston backing plate 158, or may be formed integrally therewith, the sleeve 162 being adapted to limit upward movement of the piston by engaging a shoulder 164 formed at the upper end of the cylinder 152. An air vent 166 is preferably provided in the upper end of the pressure reservoir 148. The lower end of the cylinder 152, beneath the piston 154, is in communication with the space 168 in which the spring 142 is located, by means of a pair of drilled passageways 170 (Fig. 3).

The measuring valve operates in the following manner: Upon the supply of lubricant under pressure to the passageway 126 the central portion of the flexible valve 138 will first be pressed downwardly to form a seal against the seating end face 136 of the projection 134 and thereafter upon further increase in the pressure of the lubricant supplied, the peripheral portion of the valve 138 will be pressed away from the seat, against the force of the spring 142, and permit lubricant to flow into the space 168 and thence through the passageways 170 to the lower end of the cylinder 152 of the pressure reservoir. The lubricant will flow into this reservoir, raising the piston 154 against the force of the compression coil spring 160 until the upward movement of the piston is limited by the engagement of the sleeve 162 with the shoulder 164.

When the pressures on both sides of the valve 138 are then equalized, the outer edge portion of the valve 138 will again be pressed against its seat 140 by the spring 142. Upon a reduction in the pressure of the lubricant supplied to the measuring valve, the valve 138 will again flex to the position in which it is shown in Fig. 2 and thus permit lubricant to flow from the pressure reservoir through the passageways 170 into the space 168 and thence through the longitudinal bore in the valve seat member 126 to the part to be lubricated. The speed at which the pressure reservoir is discharged will depend in a large measure upon the degree of resistance to flow of lubricant which is offered by the part to be lubricated.

From the above description of the operation of the measuring valve it will be apparent that to insure that it function properly, it is necessary that lubricant be supplied intermittently under high pressure and that the pressure be relieved substantially during the intervals between the application of pressure. The pump mechanism above described is admirably adapted for this purpose. As previously stated, the pump plunger 20 is operated continuously to supply oil under pressure to the passageway 44. Assuming the valve 68 to be in the position in which it is shown in Fig. 1, the lubricant will flow from the passageway 44 through the conduit 46, passageway 48 and conduit 50 to the various measuring valves until all of the measuring valves have had their pressure reservoirs completely filled with lubricant.

When the measuring valves are thus completely charged, the pressure in the conduit will build up sufficiently to overcome the force of the spring 186 behind the check valve 108 and the lubricant supplied by the pump will thereafter flow past the check valve 108 into the lower end of the cylinder 92. Since the valve 108 should remain closed until all of the measuring valves have been completely charged, it will be apparent that the spring 186 must be made stronger (in pounds of fluid pressure which it will resist) than the springs 160 in the pressure reservoirs of the measuring valves. As the lubricant is pumped into the lower end of the cylinder 92, the piston 90 therein will be raised until the spring 96 is compressed sufficiently to overcome the resistance to movement of the valve 68 which is offered by the spring pressed rollers 78. When this resistance has been overcome the valve 68 will snap rapidly from the position in which it is shown in Fig. 1 to a position in which the annular passageway 72 is in communication with the passageways 74, 76. Thereafter lubricant discharged by the pump will flow from the passageway 76, the latter being preferably directed so as to supply the cam 24 and the head 22 of the plunger 20 with a copious amount of oil.

Throughout the period while the lubricant was being forced past the check valve into the lower end of the cylinder 92, some of this lubricant flowed from the cylinder through the port 112 of the needle valve 114. The flow past the needle valve cannot, however, be at a sufficiently rapid rate materially to interfere with the raising of the piston 190. However, when the valve 68 has been raised to its uppermost position and lubricant therefore no longer flows into the lower end of the cylinder past the check valve 108, the escape of lubricant between the needle valve 114 and its seat will permit the piston 90 to descend gradually until the spring 100 presses against the upper end of the valve 68 with sufficient force to overcome the resistance offered by the spring pressed rollers 78 and to snap the valve downwardly to the position in which it is shown in Fig. 1. When the valve 68 has been moved to its lowermost position the pressure in the discharge conduit 50 will again be built up and the cycle of operation previously described will be repeated.

It will be noted that the interval between successive charging operations will depend upon the rate at which the piston 90 moves downwardly in its cylinder 92 and that the rate of this movement of the piston may readily be controlled by adjusting the size of the orifice of the needle valve 114. For any given setting of the valve 114 the rate of discharge of lubricant from the cylinder 92 will be determined by the viscosity of the lubricant. Since in most instances the measuring valves will operate more slowly, and the lubricant will escape from the bearings at a slower rate, when the lubricant is of high viscosity, this regulation of the duration of intervals between lubricant supplying operations is of some advantage. In this connection, it might be well to observe that the viscosity determinant above discussed, as related to flow under any given setting of the valve 114, may be of particular significance in a number of instances, such as where lubricant of different viscosities are used alternately in the system, or at different times, or, where the lubricant used is subjected to temperature changes, in which case a slower flow would be present where the temperature was low. Since higher viscosities or lower temperatures also bring about a slower escape of lubricant from the bearings lubricated, it is a very advantageous feature of the present invention that the system disclosed is responsive to such viscosity flow determinants so that the lubricant feed will be paced with the speed of the escape of lubricant from the bearing. Greater economies in lubricant results, and the system is practically automatic in this respect in that it eliminates much valve adjustment otherwise necessary for the correct operation of such lubricating systems.

Yet it should not be overlooked that if the result brought about by the change in viscosity is not desired, it will be appreciated that the flow can be altered by an adjustment of the valve 114 to suit the need of any particular occasion.

Consequently, although the needle valve permits a wide range of adjustment, with any given adjustment the length of the intervals between charging operations will be very accurate in measuring automatically the correct amount of lubricant to replace the lubricant escaping from the bearings, in fact more accurate than required.

In Fig. 4 I have diagrammatically illustrated a slightly modified form of my invention which operates upon essentially the same principle as the construction shown in Fig. 1, but which differs in the construction of several of the elements. To avoid duplication similar reference characters have been applied to parts which are sufficiently similar to the corresponding parts of the previously described construction to obviate the necessity for further description. In this construction the piston 180 has a stem 182 connected thereto by a lost motion connection, the stem 182 being connected to the valve 184 by a tension and compression coil spring 186. The lubricant discharged from the pump cylinder 188 flows through a conduit 190 to a cross-T 192. A conduit 194 leads from the cross-T 192 to the conduit 50 supplying the measuring valve 60. A second conduit 196 leads from the cross-T 192 to the valve body 198, the flow through which is controlled by the valve 184. A third conduit 200 leads from the cross-T 192 to a check valve chamber 202 and flow through this latter conduit is normally prevented by a spring pressed check valve 204 held against a seat 206 by a compression coil spring 208, the force of which may be varied by adjustment of a plug 210 forming the seat for the lower end of the check valve.

Lubricant which flows past the check valve 204 may flow through a conduit 212 to the lower end of a cylinder 92 or may flow through a conduit 214 to a flow metering device comprising an internally threaded body 216 and an adjustable plug member 218. The plug member preferably has a thread mutilated by having its apex ground therefrom so that a helical passageway of relatively small cross-sectional area is formed between the plug 218 and the body 216. This relatively long helical passageway will offer considerable resistance to the flow of lubricant. The effective length of the passageway (and hence the degree of resistance offered thereby) may readily be varied by screwing the plug a greater or lesser distance into the body.

As previously stated, the construction diagrammatically shown in Fig. 4 operates in substantially the same manner as the construction illustrated in Fig. 1. A description of this operation is therefore believed to be unnecessary. It is merely necessary to state that the flow resistance device 216, 218 forms a more sensitive device for controlling the escape of lubricant from the lower end of the cylinder 92, than does the needle valve 114. If, for example, it is desired that the measuring valve be charged at exceedingly long intervals, a resistance device of the screw-threaded type shown in Fig. 4 might be preferred to a needle valve type of restricted orifice as shown in Fig. 1, since if the needle valve is adjusted to form too small an orifice it is subject to becoming clogged by minute impurities contained in the oil.

While I have illustrated and described preferred embodiments of my invention, many modifications may be made without departing from the spirit of the invention, and I do not wish to be limited to the precise details set forth but desire to avail myself of all changes within the scope of the appended claims.

Having thus described my invention, what I claim as new and desire to secure by Letters Patent of the United States is:

1. In a centralized lubricating system, the combination of a plurality of bearings to be lubricated, metering means associated with each of said bearings, a conduit system connecting said metering means, a source of lubricant supply, a continuously operating pump for feeding lubricant from said source to said conduit system, a valve for relieving the pressure in said conduit system to atmospheric pressure, lubricant receiving pressure operated means for opening said valve, means for gradually relieving the said pressure operated means of lubricant received thereby, means for supplying lubricant to said last named means only when the pressure in the conduit system attains a predetermined maximum, resilient means associated with said lubricant receiving valve opening means to cause the latter to close said valve upon the relief of lubricant from said means, and manually operable means to control the rate of relief of lubricant from said lubricant receiving means.

2. In a centralized lubricating system, the combination of a plurality of bearings to be lubricated, pressure operated metering means associated with each of said bearings, a conduit system connecting said metering means, a source of lubricant supply, a continuously operating pump for feeding lubricant from said source to said conduit system, a valve for relieving the pressure in said conduit system to atmospheric pressure, a lubricant receiving pressure operated means for opening said valve whenever the pressure in the conduit system exceeds the pressure necessary for the operation of said metering means, means for gradually relieving said lubricant receiving means of lubricant received thereby, resilient means associated with said lubricant receiving valve opening means to cause the latter to close said valve upon the relief of lubricant from said means, and manually operable means to control the rate of relief of lubricant from said lubricant receiving means thereby to regulate the intervals between the application of pressure to said conduit system.

3. In combination, a plurality of bearings to be lubricated, metering means associated with each of said bearings, a conduit system connecting said metering means, means to supply lubricant under pressure to said conduit system, means including a valve opened to relieve the lubricant pressure in said conduit system whenever it attains a predetermined and unvarying maximum pressure, and hydraulic means for closing said valve after it has been opened for a predetermined interval including a restricted open passageway offering resistance to the flow of lubricant therethrough in proportion to the viscosity of lubricant passing therethrough whereby the duration of the interval is determined by the viscosity of the lubricant.

4. In combination, a plurality of bearings to be lubricated, a lubricant pressure operated measuring valve associated with each of said bearings, a conduit system connecting said measuring valves, means to supply lubricant under pressure to said conduit system, means including a relief valve which is opened to relieve the lubricant pressure in said conduit system upon attainment of predetermined and unvarying maximum pressure therein, and means for closing said relief valve after it has been opened for a predetermined interval including a flow metering device dependent in part upon the temperature of fluid metered for the rate of flow whereby the duration of the interval is responsive to the viscosity of the lubricant.

5. In a centralized lubricating system, the combination of a plurality of lubricant measuring valves, one associated with each of the bearings to be lubricated, a conduit system connecting said measuring valves, a continuously operating lubricant pumping mechanism for supplying lubricant under pressure to said conduit system, means responsive to the creation of a predetermined maximum lubricant pressure regardless of lubricant viscosity for repeatedly interrupting the supply of said lubricant under pressure to provide periodic application of lubricant under pressure to said conduit system, means responsive to the viscosity of the lubricant to control the duration of the intervals between periods of application of lubricant under pressure to said conduit system, and manually operable means to adjust said means to vary the duration of said intervals.

6. A lubricant supply installation for centralized lubricating systems comprising, a pump, a discharge passageway therefor, a valve for venting said discharge passageway, a cylinder having one end connected to said passageway by a duct, a spring pressed check valve in said duct allowing flow of lubricant to said end of the cylinder above a certain pressure, a piston in said cylinder, means urging said piston toward said end of the cylinder, a resilient lost motion connection between said piston and said venting valve for opening and closing said valve in relation to the movement of said piston, and a restricted vent for permitting escape of lubricant from the end of said cylinder which is connected to said passageway.

7. In a centralized lubricating system, the combination of a plurality of lubricant metering devices, a conduit system connecting said metering devices, a lubricant pumping mechanism for supplying lubricant under pressure to said conduit system, means for repeatedly interrupting the supply of said lubricant under pressure upon the creation of a maximum invariant lubricant pressure, and means responsive to the viscosity of the lubricant to control both the duration of said interruption and the intervals between said interruptions.

8. A lubricant supply installation for centralized lubricating systems, comprising, a pump, a discharge passageway therefor, a valve for venting said discharge passageway, a cylinder having one end connected to said passageway by a duct, a spring pressed check valve in said duct admitting lubricant under pressure to said cylinder, a weighted piston in said cylinder moved by lubricant admitted thereto, means controlling the position of said venting valve including a resilient connection through which said valve may be moved in either direction by said piston, and a restricted passageway for permitting escape of lubricant from the end of said cylinder with which said duct communicates.

9. In a centralized lubricating system for a plurality of bearings, the combination of a conduit system leading to the bearings, a source of lubricant under pressure feeding said system under different temperature conditions, means for periodically preventing application of said lubricant pressure to said system during operation of the mechanism, said last-named means being responsive to the creation of a predetermined maximum lubricant pressure regardless of variations in lubricant temperature, means responsive to lubricant flow characteristics which are dependent upon the temperature of said lubricant for varying the duration of the periods between successive applications of lubricant pressure, and manually operable means for changing the adjustment of said temperature responsive means.

ERNEST W. DAVIS.